United States Patent [19]
Kennedy et al.

[11] 3,793,593
[45] Feb. 19, 1974

[54] FREQUENCY SELECTIVE NETWORK

[75] Inventors: Paul G. Kennedy, Monroeville, Pa.; George C. Sziklai, Los Ahos Hills, Calif.

[73] Assignee: Westinghouse Electric Corporation, Pittsburgh, Pa.

[22] Filed: Aug. 18, 1971

[21] Appl. No.: 172,854

[52] U.S. Cl. .................... 330/103, 330/109, 330/21
[51] Int. Cl. .................... H03f 1/36
[58] Field of Search .................... 330/103, 109, 21

[56] References Cited

UNITED STATES PATENTS

| | | | |
|---|---|---|---|
| 3,408,590 | 10/1968 | Moschytz | 330/109 X |
| 3,473,142 | 10/1969 | Herrero et al. | 330/103 X |
| 3,369,189 | 2/1968 | Hoffman et al. | 330/103 X |
| 3,586,990 | 6/1971 | Willoner | 330/107 |

*Primary Examiner*—Nathan Kaufman
*Attorney, Agent, or Firm*—C. L. O'Rourke

[57] ABSTRACT

A frequency selective network employing negative and positive feedback in conjunction with an inductorless bandpass or reject filter to provide a stable bandpass or reject characteristic. Sole adjustment of the negative feedback gain varies the center frequency of the filter over a wide frequency range without appreciably affecting the bandwidth. An all electronic frequency selective network is achieved by providing a voltage controlled variable gain stage as the means of adjusting the feedback gain.

9 Claims, 8 Drawing Figures

FREQUENCY SELECTIVE NETWORK

BACKGROUND OF THE INVENTION

1. Field of the Invention

This invention relates to improvements in frequency selective networks with high stability capable of easy adjustment of the center frequency.

2. Description of the Prior Art

Increased use of monolithic circuits has increased the desirability of achieving inductorless filtering. A common type of selective band-pass or band-reject network which uses only one type of reactive element, capacitive, is a twin-T network. Normally, to tune this type of network over a range of frequencies, two or more elements must be varied in precise tracking relationship to maintain the frequency response characteristic while varying the center frequency. When specific values are chosen for the circuit element, it has been possible to tune this type of network over a relatively narrow range of frequencies by varying one resistive element. See, for instance, United States Pat. No. 3,072,868.

Other frequency responsive networks are known in the art which employ only resistive and capacitive elements. Generally, however, at least two elements have to be varied to maintain a relatively constant bandwidth while tuning the network over a wide range of frequencies. See, for example, United States Pat. Nos. 3,296,463 and 3,296,464.

Tuning a frequency responsive network for such applications as signal seeking receivers has generally been accomplished by mechanical means including the use of an electric motor. Where one element must be varied in close tracking relationship to another, such a system can be elaborate and complex.

SUMMARY OF THE INVENTION

The improved frequency selective network of this invention includes an amplifier, both negative and positive feedback paths the inputs of which are provided by the output of the amplifier, and filter network responsive to the feedback inputs to provide a stable band-pass characteristic. The frequency selective network is made tunable by introducing a second negative feedback path and means to vary the relative gain between the two negative feedback paths so that the filter network is responsive to the relative gain between the negative feedback paths thereby varying the center frequency of the filter network.

BRIEF DESCRIPTION OF DRAWINGS

Like reference characters will be used to identify like components in the various figures of the drawings.

DESCRIPTION OF THE PREFERRED EMBODIMENTS

Although the circuits described and shown herein utilize a twin-T type filter network, it will be understood that the underlying principles are also applicable to other types of filter networks.

Figure 1:
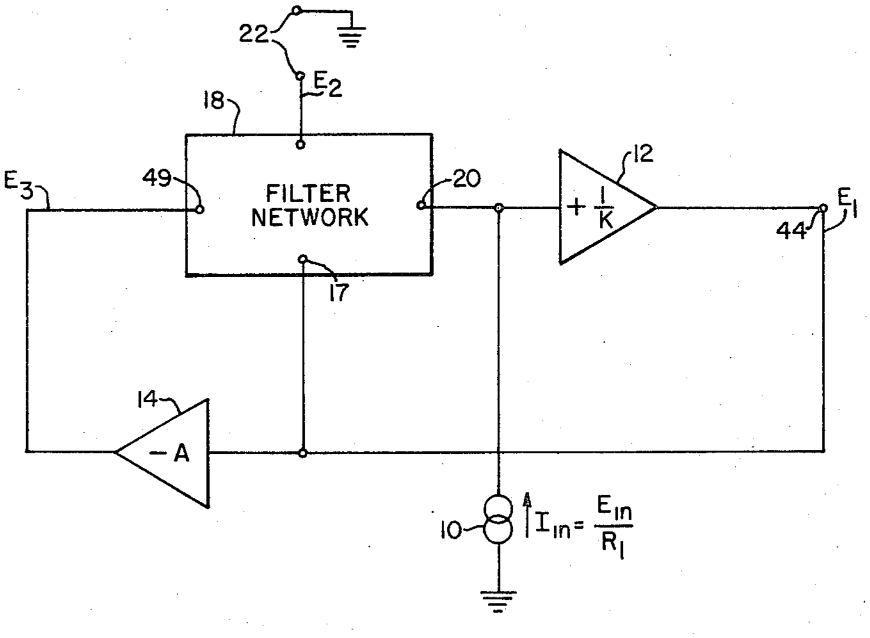
FIG. 1 is a block diagram of a frequency selective network embodying the present invention.

The circuit of FIG. 1 includes an input current source 10 having a high output impedance. The amplifier stage 12 is driven by the current source 10 and in addition to having a low output impedance has a high input impedance. The output impedance of the current source 10 and the input impedance of the amplifier stage 12 must be large compared to the apparent impedance of the filter network 18. The output of the amplifier stage 12 is applied to the input of negative feedback means 14. A positive feedback means is provided by connecting the output of amplifier 12 to the filter network at terminal 17. Output 20 of filter network 18 is applied to the input of amplifier stage 12 to complete the negative feedback path. A first output $E_1$ of the frequency selective network is taken at junction 44, the output of amplifier stage 12. A second output $E_2$ of the frequency selective network is provided at terminals 22.

Figure 2:
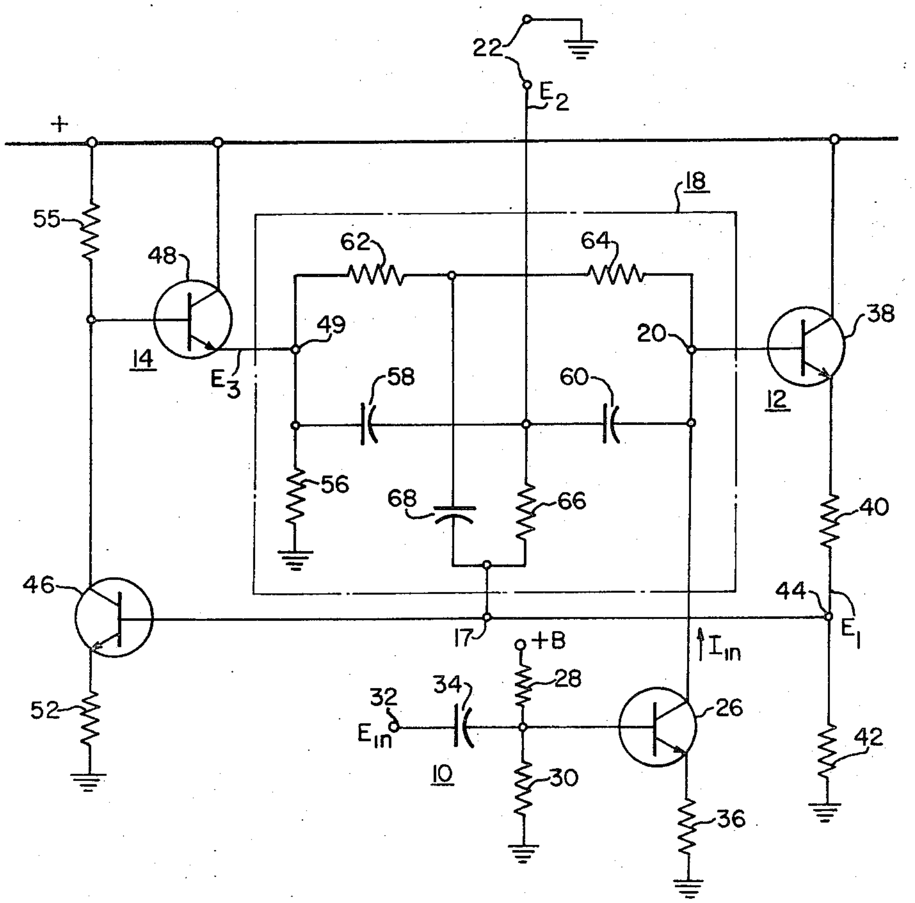
FIG. 2 is a schematic circuit diagram of the frequency selective network shown in FIG. 1 constructed according to one embodiment of the invention.

The frequency selective network of FIG. 2 is a specific embodiment of the invention using a twin-T type of filter circuit. An input signal is applied to the frequency selective network by current source 10 which utilizes a transistor 26 having a collector, a base, and an emitter. Operating bias is applied to the base of transistor 26 by a voltage divider including a pair of resistors 28 and 30, one end of resistor 28 being positively biased and one end of resistor 30 running to ground. The base of transistor 26 is connected to a signal input terminal 32 where signal $E_{in}$, the signal to be processed by the filter, is applied through a coupling capacitor 34. The emitter of transistor 26 is connected to ground through a resistor 36. The output of transistor 26 is applied to the input of the amplifier stage 12.

The amplifier stage 12 utilizes an emitter follower 38 having a base, a collector and emitter. The emitter follower 38 has relatively high input impedance to avoid loading terminal 20 and provides a very low output impedance for terminal 17. The emitter follower furnishes positive feedback stability to the network since gain can be as much as 0.99 (K=1.01) without danger of reaching or exceeding unity. The input signal $I_{in}$ from source 10 is applied to the base of the emitter follower 38. The collector is biased positively and the emitter is connected to ground through resistors 40 and 42. The output of the amplifier stage 12 taken from the junction 14 of the resistors 40 and 42 is applied to the base of transistor 46.

Negative feedback is achieved by means of coupling the output of the amplifier stage 12 through the transistor 46 which acts to invert the signal to transistor 48. The transistor 46 includes a collector, base and emitter. The emitter is connected to ground through the resistor 52. The output taken from the collector is applied directly to the base of transistor 48, resistor 55 providing d.c. bias to the base of transistor 48. The collector of transistor 48 is connected to positive d.c. bias. The output of transistor 48, taken from the emitter is applied to input 49 of filter means 18.

The filter means 18 comprises a pair of series connected capacitors 58 and 60 of equal capacitance and a pair of series connected resistors 62 and 64 of equal resistance, capacitor 60 being joined to resistor 64 at junction 20 and capacitor 58 being joined to resistor 62 at junction 49. The junction of the capacitors 58 and 60 is connected to junction 17 through resistor 66, having a value of resistance equal to one-half that of either resistor 62 and 64, to form a first branch while the junction of the resistors 62 and 64 is connected to junction 17 through a capacitor 68, having twice the capacitance of either capacitor 58 or 60, to form a second branch. The negative feedback loop is completed by connecting junction 20, which joins resistor 64 and capacitor 60 of the twin-T circuit, to the input of amplifier stage 12. The first output $E_1$ of the selective frequency network is taken at junction 44 between resistors 40 and 42. The second output $E_2$ of the selective frequency network can be taken from the junction of capacitors 58 and 60 to be applied to a utilization circuit (not shown). Taking the second output $E_2$ at this point provides a good bandpass function. Means for providing a second output are shown as terminals 22 one of which is at ground potential and the other is connected directly to the junction of capacitors 58 and 60. The third output $E_3$ of the selective frequency network can be taken at the emitter of the emitter follower 48 at junction 49 providing additional gain since $E_3 = -AE_1$.

Where T equals the time constant for the filter network 18, p is the Laplacian operator, the resistors 62 and 64 are equivalent and equal to R, and $R_1$ represents resistor 36, the following transfer functions apply to the circuits of FIGS. 1 and 2:

$$\frac{E_1}{E_{in}}=\frac{+2R}{R_1(K+A)}\cdot\frac{pT+1}{p^2T^2+\frac{4(K-1)}{K+A}pT+1} \quad (1)$$

$$\frac{E_2}{E_{in}}=\left(\frac{K-A}{K+A}\right)\cdot\frac{R}{R_1}\cdot\frac{pT+\frac{2}{K-A}}{p^2T^2+\frac{4(K-1)}{K+A}pT+1} \quad (2)$$

In the above equations $E_{in}$ represents the signal to be processed by the selective frequency network ; (+1/K) represents the gain of amplifier stage 12; −A represents the gain of amplifier 14.

The "Q" of the above equations is in each case approximately equal to K+A/4(K−1).

For high "Q" (narrow bandwidth) applications, the use of both positive and negative feedback loops reduces the requirements placed on A or K thereby enabling the use of local negative feedback (local feedback is provided by resistances 52 and 40 in the circuit of FIG. 2) which stabilizes the values of A and K. Thus, removal of the negative feedback loop yields a Q of K/4(K−1) while removal of the positive feedback loop yields a Q of A+K/4K. It is readily seen that by use of both negative and positive feedback the Q of the network is four times that of the product of the Qs separately obtained.

A significant feature of this network is the use of a current source to provide the input signal into the high impedance terminal of the null network. This permits use of the simple and unconditionally stable high gain positive feedback discussed in the preceding paragraph. At the same time this avoids a $p^2$ terms appearing in the numerator of the transfer characteristic (see equations (1) and (2). Normally when the twin-T is driven by an input voltage source a $p^2$ term will be found in the numerator of the transfer function. The circuit Q would thereby be severely reduced because of the occurrence of the null caused by the numerator at roughly the same frequency as the tuned peak caused by the denominator.

Figure 3:
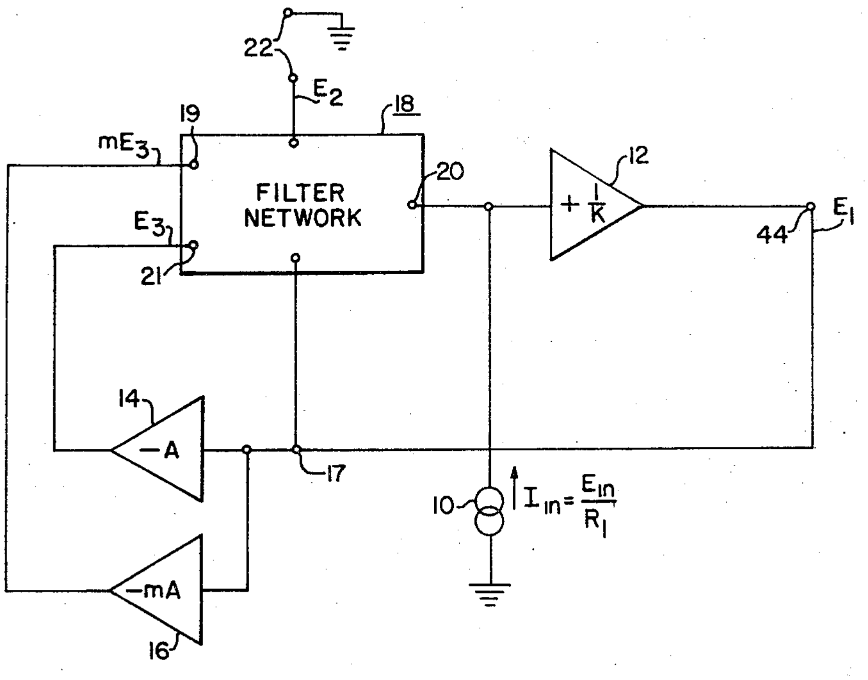
FIG. 3 is a block diagram of a tunable frequency selective network embodying the present invention.

The circuit of FIG. 3 includes means to tune the filter means 18 to various center frequencies. The circuit shown in FIG. 3 differs from that of FIG. 1 in that an additional negative feedback path is provided. The first negative feedback means 14 having a gain of −A is connected to the first negative feedback input 21 of filter means 18. The second negative feedback means 16, having a variable gain −mA where m is ≥ 1, is connected to the second negative feedback input 19 of the filter means 18. Since the gain of feedback means 16 is variable, the two negative feedback voltages applied to the filter means 18 will differ dependent on the variable factor *m*.

Figure 4:
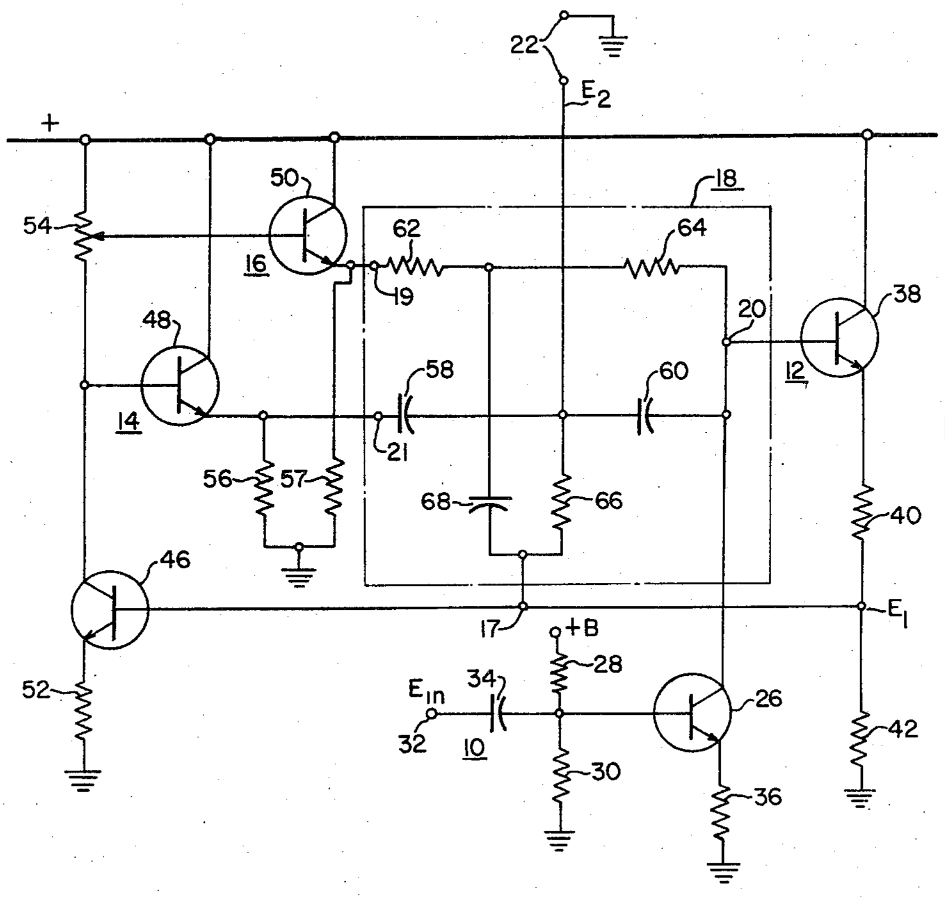
FIG. 4 is a schematic circuit diagram of a tunable frequency selective network shown in FIG. 3 constructed to another embodiment of the invention.

The following transfer function applies to the circuit of FIGS. 3 and 4:

$$\frac{E_2}{E_{in}}=\frac{K-A}{K+A}\cdot\frac{\left(pT+\frac{2}{K-A}\right)}{p^2T^2+\frac{4(K-1)}{K+A}pT+\frac{K+mA}{K+A}} \quad (3)$$

In the above equation $E_2$ represents the second output of the frequency selective network; $E_{in}$ represents the signal to be processed by the selective frequency network; (+1/K) equals the gain of amplifier stage 12; −A represents the gain of amplifier 14; and −mA represents the variable gain of amplifier 16. The frequency of resonance or the tuned frequency or the center frequency is approximately given by:

$\omega c \approx 1/T \cdot (k+mA/K+A)\ 1/2$ (4)

The bandwidth of the circuit is: $\Delta\omega \geq 1/T \cdot 4 (K-1)/K+A$ (5)

And the amplitude response at resonance is:

$G_c \geq K+A/4(K-1)$ (6)

The above equations show that neither bandwidth nor amplitude response at resonance of the circuit are affected by changes in *m*. Thus, the center frequency of the frequency selective network (the mid-frequency of the band) can be varied over a wide range, and both the bandwidth and the amplitude response at resonance of the circuit remain essentially constant.

Figure 5:
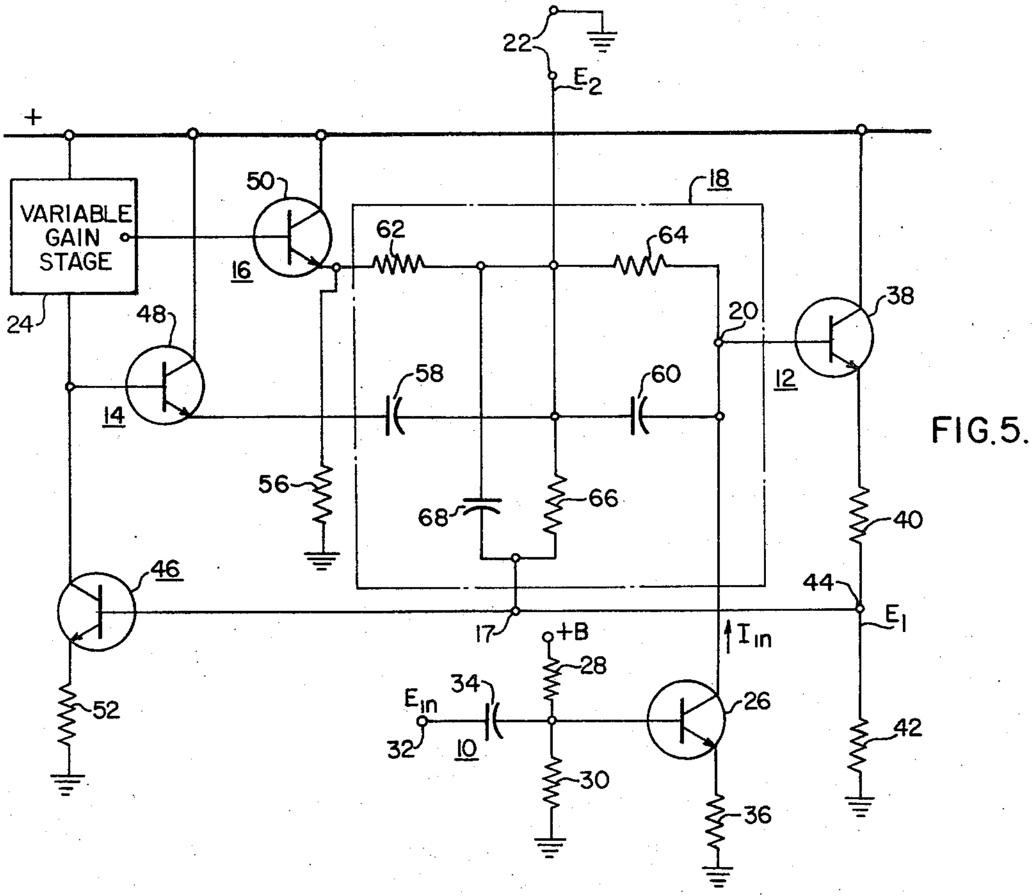
FIG. 5 is a schematic circuit diagram of an all electronic tunable frequency selective network constructed according to another embodiment of the invention showing that part of the circuit changed from FIG. 4.

The filter is responsive to the signals of the two feedback means 14 and 16; therefore, tuning is achieved by varying the gain of one feedback means 16 relative to the other feedback means 14. The difference in the signals will vary proportionally to the change in gain of feedback means 16 which is indicated by the value of *m*. The center frequency of the filter network is thereby varied with no appreciable change in the bandwidth or amplitude response at resonance. The means used to vary the gain can be a motor operated potentiometer in the input circuit of the feedback means 16 (FIG. 2) or the system can be made all electronic by employing a simple voltage controlled variable gain stage 24 in the input circuit (FIG. 5).

The frequency selective network of FIG. 4 which is adjustably tunable to different center frequencies is a specific embodiment of the invention employing a twin-T type filter circuit. The circuit of FIG. 4 is identical to that of FIG. 2 with the addition of a second negative feedback means 16 which includes potentiometer 54 and transistor 50. Negative feedback is achieved by means of coupling the output of the amplifier stage 12 through the transistor 46 which acts to invert the signal to transistors 48 and 50. The output taken from the collector of transistor 46 is applied to the base of transistor 48 and through potentiometer 54 to the base of transistor 50. The output of transistor 48, taken from the emitter which is connected to ground through resistor 56, is applied to a first negative feedback input of filter means 18 while the output of transistor 50, taken from the emitter which may be connected to ground through resistor 57, is applied to a second negative feedback input of filter means 18. The difference between the voltage of the two negative feedback inputs to the filter means 18 is varied by adjusting potentiometer 54 to increase or decrease the input to transistor 50, thereby increasing or decreasing the negative feedback gain being applied to the second negative feedback input of filter means 18. The center frequency *c* is thereby changed in accordance with equation (4).

By adjusting the potentiometer 54 the amplitude of the signal applied to the filter means 18 through transistor 50 is varied. The null for the filter means 18 is achieved when the two input signals, processed by the two branches of the twin-T circuit, cancel one another at junction 20; this happens at the particular frequency which causes the two signals to appear at junction 20 with equal amplitudes but with opposite phases. Since the second input signal can be varied in amplitude by adjusting only the variable *m*, the center frequency or null point can be changed automatically to correspond to the desired frequency.

The output of transistor 48 is applied to the first input 21 of the filter means 18 at one end of capacitor 58. The output of transistor 50 is applied to the second input 19 of the filter means 18 at the end of resistor 62. As in the frequency selective network of FIG. 2, the negative feedback loop is completed by connecting junction 20 to the input of amplifier stage 12. Also a first and second output, $E_1$ and $E_2$, of the tunable frequency selective network are provided. The response characteristic of the frequency selective network given in equation (3) above is indicative of the output $E_2$ taken at terminals 22 relative to $E_{in}$.

It will be noted that reversing the negative feedback inputs to the filter means 18 so that the output of transistor 50 is applied to the first input at the end of capacitor 58 and the output of transistor 48 is applied to the second input at the end of resistor 62 will result in a dependence of both bandwidth and gain on the value of *m*. However, such an arrangement allows adjustment of the center frequency while maintaining a constant d.c. bias at the input of the emitter follower 38. As the wiper arm of the potentiometer 54 is moved, not only is *m* varied but the d.c. bias at the input to the transistor 50 also is varied. But any changes in the d.c. conditions in the circuit of transistor 50 do not affect bias conditions at the input to the emitter follower 38 because of the blocking effect of capacitors 58 and 60 when the inputs to filter means 18 are thusly reversed. Such an arrangement may be preferable for applications in which only small trim adjustment of frequency is required.

Figure 6:
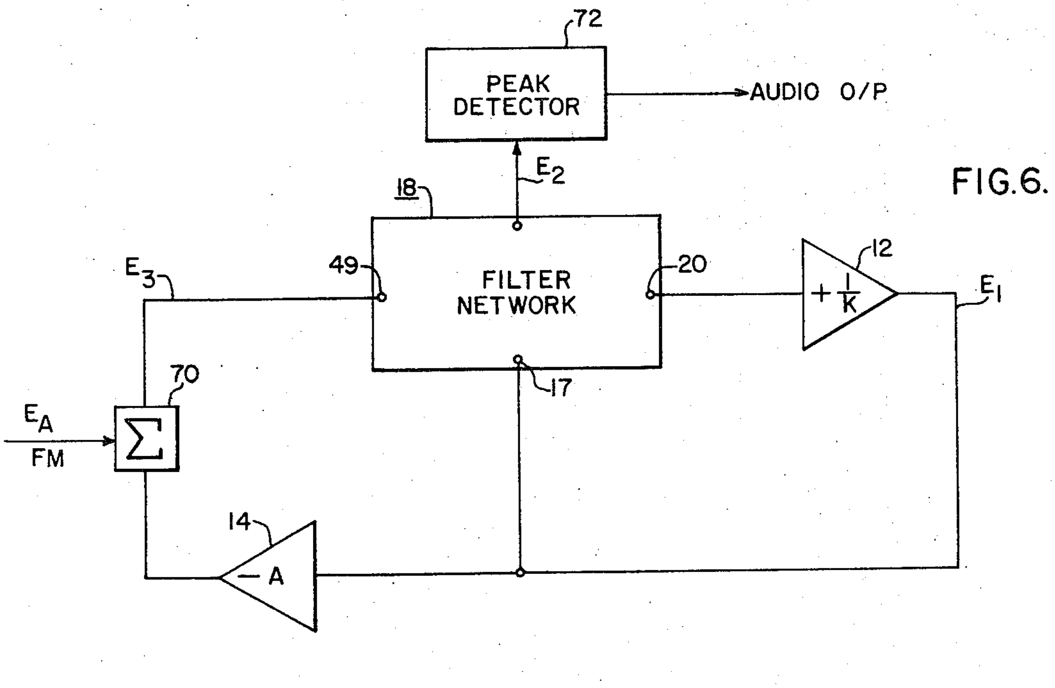
FIG. 6 is a block diagram of a frequency selective network used as an FM demodulator.
Figure 7:
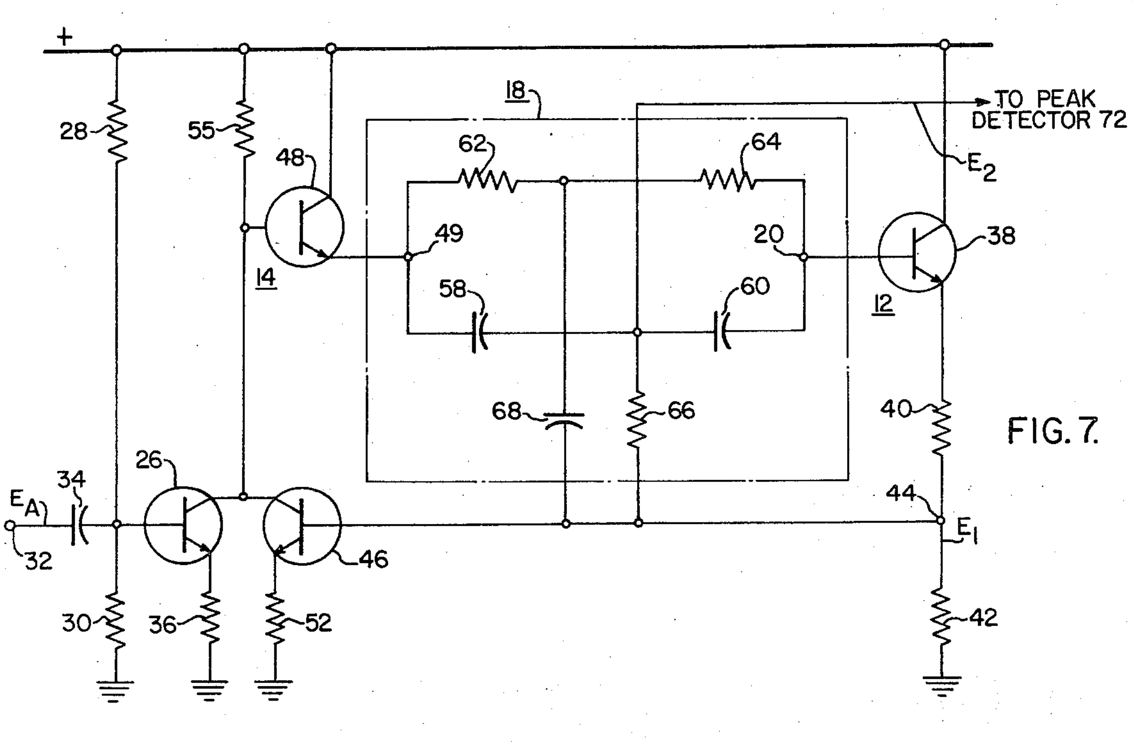
FIG. 7 is a schematic circuit diagram of the frequency selective network shown in FIG. 6 constructed according to another embodiment of the invention.

FIG. 5 shows replacement of potentiometer 54 in the circuit of FIG. 4 with a variable gain stage 24 which is voltage controlled. The input to transistor 50 can be varied by electrical means instead of mechanical means as illustrated by the potentiometer 54. The use of a voltage controlled variable gain stage 24 is particularly appropriate for such purposes as signal seeking receivers in which at the present time an elaborate mechanical system including an electric motor is usually required FIG. 6 shows the basic frequency selective circuit of FIG. 1 utilized as an inductorless FM demodulator by merely changing several external connections. First, the FM signal $E_{in}$ is summed with the negative feedback output of amplifier 14 by a summing circuit 70 and applied to filter means 18 at input 49. Secondly, the second output $E_2$ of the frequency selective network is applied to peak detector 72 to recover the information from the network processed frequency modulated signal. Thus, the input signal $E_A$ to be processed by the frequency selective network (in this case an FM signal) is applied at a different point in the network and the second output $E_2$ of the frequency selective network is applied to a specific utilization circuit, a peak detector 72. FIG. 7 is a schematic circuit diagram showing one way of applying the input FM signal $E_A$ to the frequency selective network and of connecting the second output $E_2$ to a peak detector 72.

The high conversion gain of conventional FM demodulators is normally obtained by use of the rapid change of signal phase that results when the frequency of the input signal is changed about the center frequency of an LC tuned circuit. The circuit described above and shown in FIGS. 6 and 7 achieves comparable high conversion gain without use of any coils.

Making the same assumptions as were made in determining the transfer function given by equations (1) and (2) for the networks of FIGS. 1 and 2, the following transfer function applies to the FM demodulator circuit of FIGS. 6 and 7:

$$\frac{E_2}{E_{in}}=\frac{K}{K+A}\cdot\frac{p^2T^2+\frac{K-1}{K}pT+\frac{1}{K}}{p^2T^2+\frac{4(K-1)}{K+A}pT+1} \qquad (7a)$$

$$=\underbrace{\frac{K}{K+A}\;\frac{p^2T^2+\frac{K-1}{K}pT+\frac{1}{K}}{pT}}_{\text{I}}\cdot\underbrace{\frac{pT}{p^2T^2+\frac{4(K-1)}{K+A}pT+1}}_{\text{II}} \qquad (7b)$$

Part I of equation (7*b*) describes a null in the transfer function and part II describes a resonant peak occurring at a different frequency. The center frequency of the null fuction is approximately given by:

$$\omega cI \approx 1/T \cdot (1/K)^{1/2}. \qquad (8a)$$

And the center frequency of the resonant peak is approximately given by:

$$\omega cII \approx 1/T. \qquad (8b)$$

Figure 8:
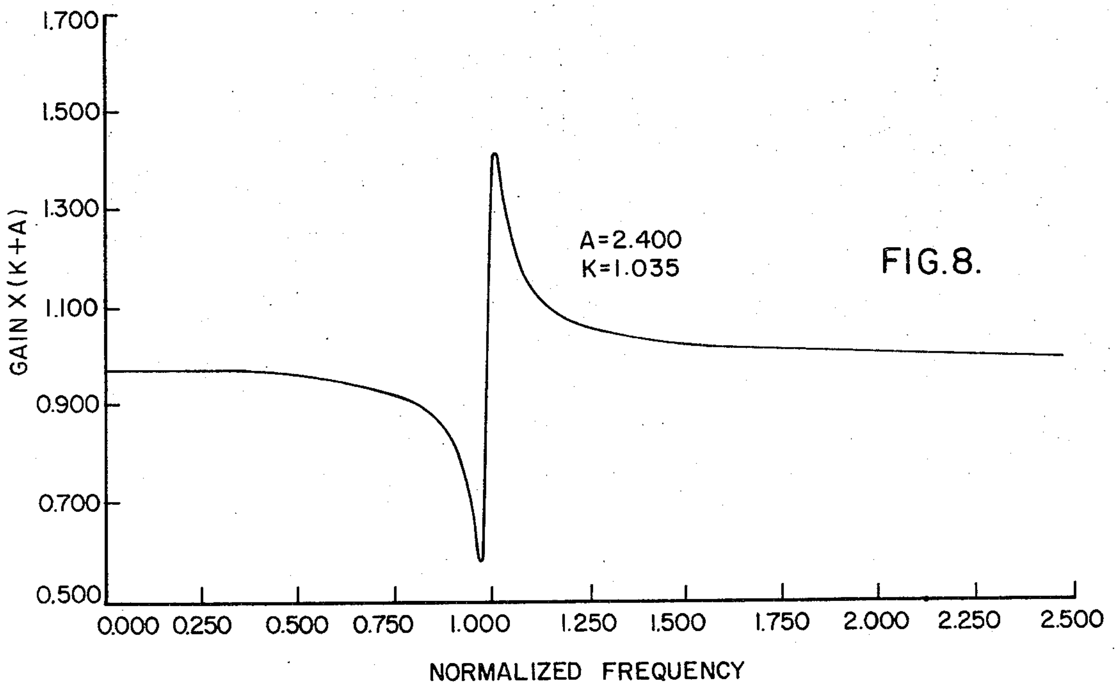
FIG. 8 is the gain response characteristic for the circuit at FIG. 6.

High conversion gain depends on the rapid change of signal gain that results when the frequency of the input signal is changed within the line of $\omega_{cI}$ and $\omega_{cII}$. The conversion gain is enhanced if both null and peak have a reflatively narrow bandwidth and an appropriately close frequency separation. The useful information that was described in the constant amplitude FM signal by frequency deviation is described, after processing by this network, by the signal amplitude taken at the second output $E_2$. By measuring the change in gain of the signal $E_2$ by a peak detector 72 as a change in amplitude of the previously limited FM signal, the modulating information can be recovered. A typical gain response characteristic for the network of FIG. 6 where K=1.035 and A=2.4 is shown in FIG. 8.

I claim:

1. A tunable frequency selective network operative with a signal input, comprising:

an amplifier responsive to said signal input for providing an output;

first and second negative feedback means responsive to said output of said amplifier, said first negative feedback means providing a constant gain feedback voltage and said second negative feedback means including means to vary the feedback gain providing a second negative feedback voltage adjustable relative to said first negative feedback voltage; and filter means responsive to said first and second negative feedback voltages so that the center frequency of said filter means varies as said second negative feedback voltage is varied and for providing an input to said amplifier completing the negative feedback path.

2. A tunable frequency selective network as recited in claim 1, wherein:

said signal input is a current source having a high output impedance so that selectivity of said network is enhanced.

3. A tunable selective frequency network as recited in claim 1, wherein:

said means to vary the feedback gain of said second feedback means includes a transistor for providing an output to said filter means and a potentiometer connected to the input of said transistor so that said output of said transistor is varied by adjustment of said potentiometer.

4. A tunable selective frequency network as recited in claim 1, wherein:

said means to vary the feedback of said second feedback means includes a transistor for providing an output and a voltage controlled variable gain stage connected to the input of said transistor so that said output of said transistor is varied by adjustment of the gain of said variable gain stage.

5. A tunable frequency selective network as recited in claim 1, wherein;

said filter means comprises a first branch including a pair of series capacitors and a resistor connecting the junction of said pair of capacitors to said output of said amplifier, a second branch including a pair of series resistors and a capacitor connecting the junction of said pair of resistors also to said output of said amplifier.

6. A tunable selective frequency network as recited in claim 5, wherein:

said output of said first negative feedback means is applied to said first branch; and said output of said second negative feedback means is applied to said second branch so that bandwidth and amplitude response at resonance of said tunable selective frequency network remain constant as the center frequency is varied.

7. A tunable selective frequency network as recited in claim 5, wherein:

said output of said first negative feedback means is applied to said second branch; and said output of said second negative feedback means is applied to said first branch so that d.c. bias of said amplifier remains constant during adjustment of center frequency of said frequency selective network.

8. A tunable frequency selective network as recited in claim 5, wherein:

said network further includes a first output taken at said output of said amplifier.

9. A tunable frequency selective network as recited in claim 5, wherein:

said filter means further includes a second output at said junction of said capacitors of said first branch for developing a utilization signal having a frequency bandpass characteristic represented by the transfer function:

$$\frac{E_2}{E_{in}}=\frac{k-A}{k+A}\cdot\frac{pT+\frac{2}{k-A}}{p^2T^2+4\frac{k-1}{k+A}pT+\frac{k+mA}{k+A}}.$$

* * * * *